(12) United States Patent
Azadet et al.

(10) Patent No.: US 6,584,159 B1
(45) Date of Patent: Jun. 24, 2003

(54) MIXED-MODE NEXT/ECHO CANCELLER FOR PULSE AMPLITUDE MODULATED (PAM) SIGNALS

(75) Inventors: Kameran Azadet, Middletown, NJ (US); David Andrew Inglis, Holmdel, NJ (US)

(73) Assignee: Agere Systems Inc., Allentown, PA (US)

( * ) Notice: Subject to any disclaimer, the term of this patent is extended or adjusted under 35 U.S.C. 154(b) by 0 days.

(21) Appl. No.: 09/188,625

(22) Filed: Nov. 9, 1998

(51) Int. Cl.$^7$ ............................................. H04B 15/00
(52) U.S. Cl. ..................... 375/285; 375/219; 375/232; 375/257; 370/290
(58) Field of Search .............................. 375/222, 223, 375/225, 221, 219, 229, 232, 233, 278, 284, 285, 346, 257; 379/3, 406, 409, 410, 411; 370/201, 286, 290, 291, 288, 289

(56) References Cited

U.S. PATENT DOCUMENTS

| | | | | |
|---|---|---|---|---|
| 5,181,198 A | * | 1/1993 | Lechleider | 370/286 |
| 5,657,384 A | * | 8/1997 | Staudacher et al. | 379/388 |
| 5,757,906 A | * | 5/1998 | Unno | 379/410 |
| 5,828,657 A | * | 10/1998 | Betts et al. | 370/289 |
| 5,835,486 A | * | 11/1998 | Davis et al. | 370/287 |
| 5,852,661 A | * | 12/1998 | Chen | 379/406.07 |
| 5,937,060 A | * | 8/1999 | Oh | 379/406.14 |

FOREIGN PATENT DOCUMENTS

| | | | |
|---|---|---|---|
| EP | 0 727 882 A2 | 8/1996 | |
| WO | WO 89/07370 | 8/1989 | |

\* cited by examiner

*Primary Examiner*—Phuong Phu
(74) *Attorney, Agent, or Firm*—Ryan, Mason & Lewis, LLP

(57) ABSTRACT

A mixed-mode crosstalk canceller is disclosed that performs crosstalk cancellation in the continuous time domain. The disclosed mixed-mode crosstalk canceller processes the pulse amplitude modulated (PAM) digital signal to be transmitted as well as the received signal to compensate for the crosstalk between the transmit and receive signals. The output of the crosstalk canceller is subtracted from the received signal in the continuous time domain. Thus, the transmit symbol clock and the receive symbol clock can be asynchronous. The tap weights for the crosstalk cancellation are illustratively obtained using a modified version of the least mean square (LMS) algorithm for discrete time signals. The modified least mean square (LMS) algorithm is applied for continuous time signals that are derived from different clocks. Since, the LMS algorithm requires a costly multiplication of the error signal, e(t), and the digital transmit signal, $x_k(t)$, and it is only necessary to go in the direction of the gradient with the steepest decent, computational gains are achieved using a correlation multiplier that quantizes e(t) and $x_k(t)$ with only one or two bits. The quantized version of the error signal, e(t), indicates the sign of the error (positive or negative) and is obtained in the illustrative embodiment by comparing the error signal to zero. A crosstalk canceller updates each tap weight utilizing the disclosed correlation multiplier that provides a signal indicating whether the tap weight needs to be increased or decreased to a charge pump that produces a current in the proper direction.

24 Claims, 7 Drawing Sheets

MAPPING TABLE

| $a_0$ | $a_1$ | $x_k$ VALUE |
|---|---|---|
| 0 | 0 | -1 |
| 1 | 0 | 0 |
| 0 | 1 | 0 |
| 1 | 1 | +1 |

FIG. 5B   $sg = sg(\tilde{e}) \cdot sg(x)$

THERMOMETER CODE TO SYMBOL MAPPING TABLE

| 2 LEVEL PAM (NRZ) | | 3 LEVEL PAM | | | 4 LEVEL PAM | | | | 5 LEVEL PAM | | | | |
|---|---|---|---|---|---|---|---|---|---|---|---|---|---|
| $a_0$ | SYMBOL | $a_0$ | $a_1$ | SYMBOL | $a_0$ | $a_1$ | $a_2$ | SYMBOL | $a_0$ | $a_1$ | $a_2$ | $a_3$ | SYMBOL |
| 0 | +1 | 0 | 0 | -2 | 0 | 0 | 0 | -3 | 0 | 0 | 0 | 0 | -4 |
| 1 | -1 | 0 | 1 | 0 | 0 | 0 | 1 | -1 | 0 | 0 | 0 | 1 | -2 |
|   |   | 1 | 1 | -2 | 0 | 1 | 1 | +1 | 0 | 0 | 1 | 1 | 0 |
|   |   |   |   |   | 1 | 1 | 1 | +3 | 0 | 1 | 1 | 1 | +2 |
|   |   |   |   |   |   |   |   |   | 1 | 1 | 1 | 1 | +4 |

FIG. 10

MIXED-MODE NEXT/ECHO CANCELLER FOR PULSE AMPLITUDE MODULATED (PAM) SIGNALS

FIELD OF THE INVENTION

The present invention relates generally to crosstalk cancellation techniques and more particularly, to methods and apparatus for reducing near-end crosstalk (NEXT) and echo crosstalk in the continuous time domain.

BACKGROUND OF THE INVENTION

FIG. 1 illustrates a hybrid transceiver 100 that transmits and receives signals on the same twisted pair (TP) 110. The hybrid transceiver 100 is commonly associated with a local area network (LAN) or digital subscriber loops (xDSL). The main sources of crosstalk in such a transceiver 100 are usually near-end crosstalk (NEXT) and Echo crosstalk. Each hybrid transceiver, such as the transceiver 100, transmits a first signal, $V_1$, and receives a different signal, $V_2$, on the same twisted pair 110. Near-end crosstalk (NEXT) results from transmitting and receiving different signals on different twisted pairs 110 and having a signal on one twisted pair interfering with the signal on another twisted pair. $V_1$ corresponds to the transmitted signal generated by the transceiver 100. $V_2$ corresponds to the received signal generated by a second transceiver 120. Since the transceiver 100 knows the transmitted signal, $V_1$, that it has generated, the transceiver 100 can subtract the transmitted signal, $V_1$, from the voltage $(V_1+V_2)$ on the twisted pair (TP) 110, to obtain the voltage corresponding to the received signal $V_2$.

Echo crosstalk, on the other hand, is the result of crosstalk on the same twisted pair 110 and of discontinuous impedances along a given path, for example, at each connector. When the transceiver 100 transmits a signal, $V_1$, each impedance discontinuity along the path causes the transceiver 100 to receive a wave or echo back. FIG. 2 corresponds to the impulse response 200 of an impulse signal transmitted along the twisted pair (TP) 110 by the transceiver 100. Generally, each peak 210–213 in the impulse response 200 corresponds to a different connector (not shown) on the twisted pair (TP) 110. The impulse response 200 is utilized to obtain the echo path and then adjust the taps of an echo canceller (not shown) to the peaks of the echo impulse response. The taps are adjusted, for example, using the well known least mean square (LMS) algorithm, to match the energy and delay of the echo canceller to the peaks of the echo impulse response.

If the echo impulse response is not dynamic, the tap values converge and remain constant. In a synchronous communication system, for example, the impulse response is static and coincides w with the symbol rate. Thus, the echo canceller can be implemented using low cost, low power digital circuitry. In many applications, however, the transmitter and receiver are not synchronized and the resulting impulse response is dynamic. In such an asynchronous communication system, a frequency offset exists between the transmitter and the receiver.

As apparent from the above-described deficiencies with conventional crosstalk cancellation techniques, a need exists for a finite impulse response (FIR) filter that emulates the crosstalk and tracks the frequency offset of asynchronous communication systems. A further need exists for a clock recovery circuit to recover the clock of the received signal, to determine when to sample the received signal.

SUMMARY OF THE INVENTION

Generally, a mixed-mode crosstalk canceller is disclosed that performs crosstalk cancellation in the continuous time domain. The disclosed mixed-mode crosstalk canceller processes the pulse amplitude modulated (PAM) digital signal to be transmitted as well as the received signal to compensate for the crosstalk between the transmit and receive signals. In accordance with one aspect of the invention, the output of the crosstalk canceller is subtracted from the received signal in the continuous time domain. Thus, the transmit symbol clock and the receive symbol clock can be asynchronous.

In the illustrative embodiment, the tap weights for the crosstalk cancellation are obtained using a modified version of the least mean square (LMS) algorithm for discrete time signals. The modified least mean square (LMS) algorithm is applied for continuous time signals that are derived from different clocks, using the following equation:

$$w_k(n+1) = w_k(n) + \mu \tilde{e}(t) \cdot x_k(t)$$

Thus, the LMS algorithm requires a costly multiplication of the error signal, $e(t)$, and the digital transmit signal, $x_k(t)$. Since it is only necessary to go in the direction of the gradient with the steepest decent, however, computational gains are achieved in accordance with the present invention using a correlation multiplier that quantizes $e(t)$ and $x_k(t)$ with only one or two bits, and performs the correlation multiplication using an asynchronous logic circuit. In the illustrative embodiment, the correlation multiplier receives a 2 bit quantized representation of the digital transmit signal, $x_k(t)$, and a 1 bit quantized version of the error signal, $e(t)$. The quantized version of the error signal, $e(t)$, indicates the sign of the error (positive or negative) and is obtained in the illustrative embodiment by comparing the error signal to zero.

A crosstalk canceller is disclosed that updates each tap weight utilizing the disclosed correlation multiplier that provides a signal indicating whether the tap weight needs to be increased or decreased to a charge pump that produces a current in-the proper direction.

A more complete understanding of the present invention, as well as further features and advantages of the present invention, will be obtained by reference to the following detailed description and drawings.

BRIEF DESCRIPTION OF THE DRAWINGS

FIG. 5B illustrates the logic circuitry for the correlation multiplier of FIG. 6;

FIG. 10 is a set of sample tables illustrating the thermometer code to symbol mapping in the multiplying digital-to-analog converter (DAC) of FIG. 9.

DETAILED DESCRIPTION

According to a feature of the present invention, a mixed-mode crosstalk canceller is disclosed that allows crosstalk cancellation in the continuous time domain. Thus, the present invention permits asynchronous signals to be processed. It is noted that a number of modem standards, such as 100 Base Tx, allow the transmitter and receiver to be asynchronous, making digital crosstalk cancellation difficult.

Figure 1:
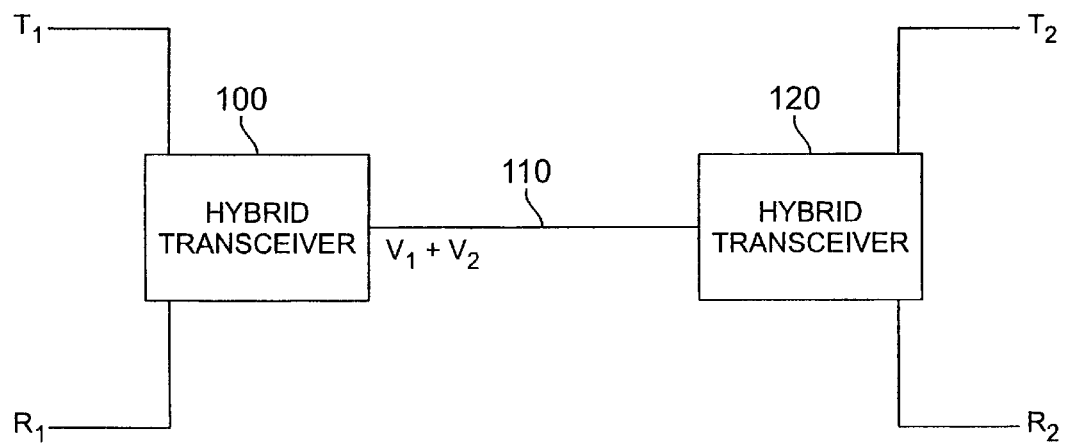
FIG. 1 illustrates a conventional hybrid transceiver that transmits and receives signals on the same twisted pair (TP)
Figure 2:
FIG. 2 illustrates the impulse response of an impulse signal transmitted along the twisted pair (TP) of FIG. 1 by the transceiver.
Figure 3:
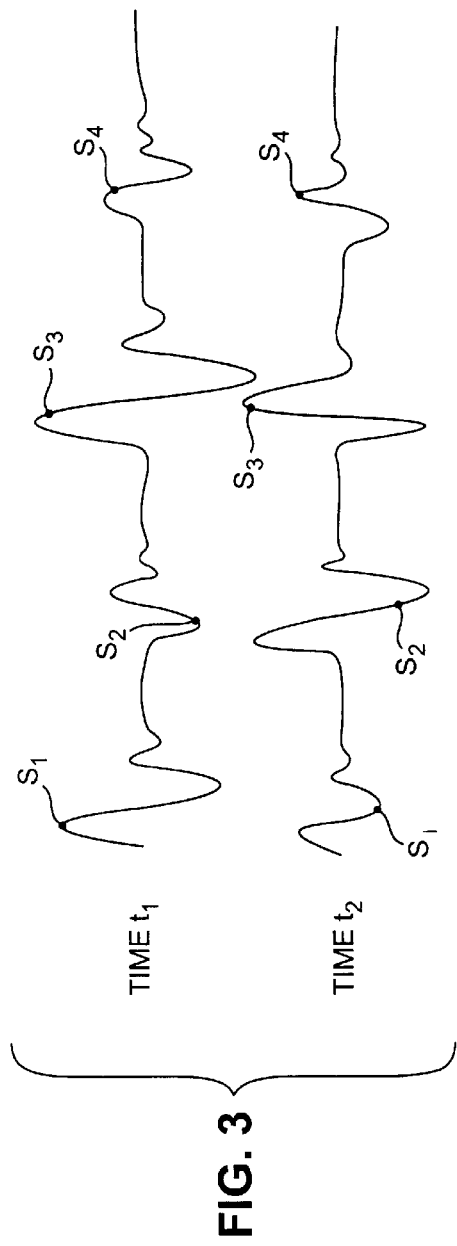
FIG. 3 illustrates a stream of asynchronous crosstalk pulses at two different instants of time, $t_1$ and $t_2$.

FIG. 3 shows a stream of asynchronous crosstalk pulses at two different instants of time, $t_1$ and $t_2$. Due to the frequency offset between the transmit clock and the receive clock, the crosstalk impulses are sampled at different phases, $s_1$ through $s_4$, for times $t_1$ and $t_2$. Thus, the received signal is sampled by the transceiver 100 with a time-varying phase.

Figure 4:
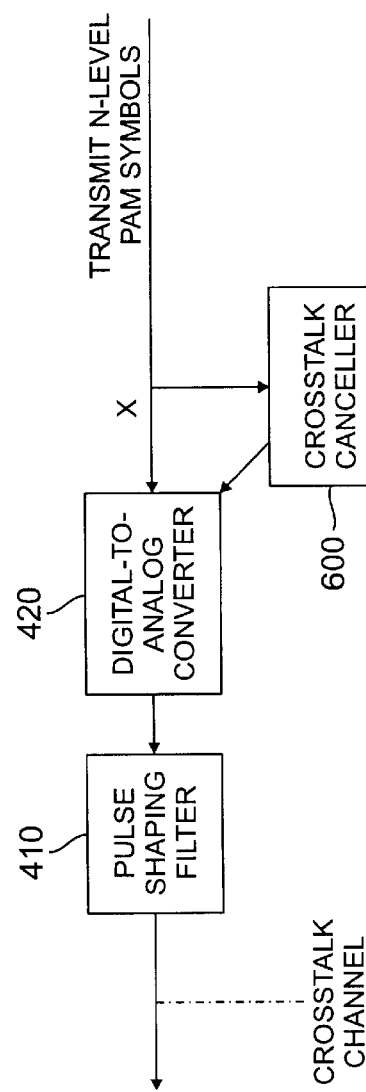
FIG. 4 illustrates a schematic block diagram of a mixed-mode crosstalk canceller in accordance with the present invention.

FIG. 4 shows a schematic block diagram of a mixed-mode crosstalk canceller 400 in accordance with the present invention. As shown in FIG. 4, the input, X, of the mixed-mode crosstalk canceller 400 is a digital number representing an N-level pulse amplitude modulated (PAM) signal to be transmitted. A pulse-shaping filter 410 can be placed before or after the digital-to-analog converter (DAC) 420, depending on whether the pulse shaping is performed on the signal in digital or analog form. In any event, the architecture of the mixed-mode crosstalk canceller 400 is independent of the pulse shaping, since the pulse-shaping filter 410 can be considered part of the crosstalk channel. The mixed-mode crosstalk canceller 400 also includes a track and hold amplifier 430 and an analog-to-digital converter (ADC) 440.

In accordance with a further feature of the invention, the mixed-mode crosstalk canceller 400 includes a crosstalk canceller 600, discussed further below in conjunction with FIG. 6, to compensate for the crosstalk between the transmit and receive signals. Since the output of the crosstalk canceller 600 is subtracted from the received signal in the continuous time domain, the transmit symbol clock and the receive symbol clock can be asynchronous.

TAP UPDATE CALCULATION

As discussed further below, if the correlation, $E(x_k \cdot e)$, is computed in the continuous-time analog domain, $x_k$ and $e$ can be asynchronous signals. The continuous time tap adaptation algorithm can be derived by rewriting the expression of the gradient in the continuous-time domain:

$$\vec{G} = \left(\frac{\partial E(e^2(t))}{\partial w_k}\right)_k$$

where:

$$\left(\frac{\partial E(e^2(t))}{\partial w_k}\right) = 2E\left(e(t) \cdot \frac{\partial e(t)}{\partial w_k}\right) \quad \text{Eq. (1)}$$

If the output of the crosstalk canceller 600 is $\Sigma w_j x_j(t)$, and the receive signal is $r(t)$, the reference signal is $R(t)$ and N is the number of taps, then the error signal, $e(t)$, can be expressed as:

$$e(t) = r(t) - \sum_{0}^{N-1} w_j \cdot x_j(t) - R(t) \quad \text{Eq. (2)}$$

$$\text{and } \frac{\partial e(t)}{\partial w_k} = -x_k(t) \quad \text{Eq. (3)}$$

Substituting equation 3 into equation 1, we find:

$$\left(\frac{\partial E(e^2(t))}{\partial w_k}\right) = -2E(e(t) \cdot x_k(t)) \quad \text{Eq. (4)}$$

Equation 2 requires the knowledge of a reference signal. In systems using a training sequence, R is available at start-up. However, in such a system, updates can usually not be performed during a normal data transmission mode. An alternative solution is to use a modified error signal, $\tilde{e}$:

$$\tilde{e}(t) = r(t) - \sum_{j=0}^{N-1} w_j x_j(t) \quad \text{Eq. (5)}$$

Replacing Equation 5 in Equation 4, we obtain:

$$\frac{\partial e^2(t)}{\partial w_k} = -2E[(\tilde{e}(t) - R(t)) \cdot x_k(t)] \quad \text{Eq. (6)}$$

$$= -2E(\tilde{e}(t) \cdot x_k(t)) + \underbrace{2E(R(t) \cdot x_k(t))}_{=0}$$

In Equation 6, the second term is equal to zero since R and x are uncorrelated signals (receive symbols and transmit symbols are uncorrelated). Therefore, the conventional tap update algorithm can be modified to:

$$w_k(n+1) = w_k(n) + \mu \tilde{e}(t) \cdot x_k(t) \quad \text{Eq. (7)}$$

where $\mu$ is a small constant, called step size. Equation 7 is very similar to the expression of the LMS tap update for discrete time signals, with $e(t)$ and $x_k(t)$ being continuous time, sampled and held cyclostationary signals that are derived from different clocks. Since it is difficult to multiply $\tilde{e}(t)$ times $x_k(t)$, and it is only necessary to go in the direction of the gradient with the steepest decent, $\tilde{e}(t)$ and $x_k(t)$ can be quantized with a small number of bits, and the correlation multiplication can be performed using an asynchronous logic circuit.

Figure 5A:
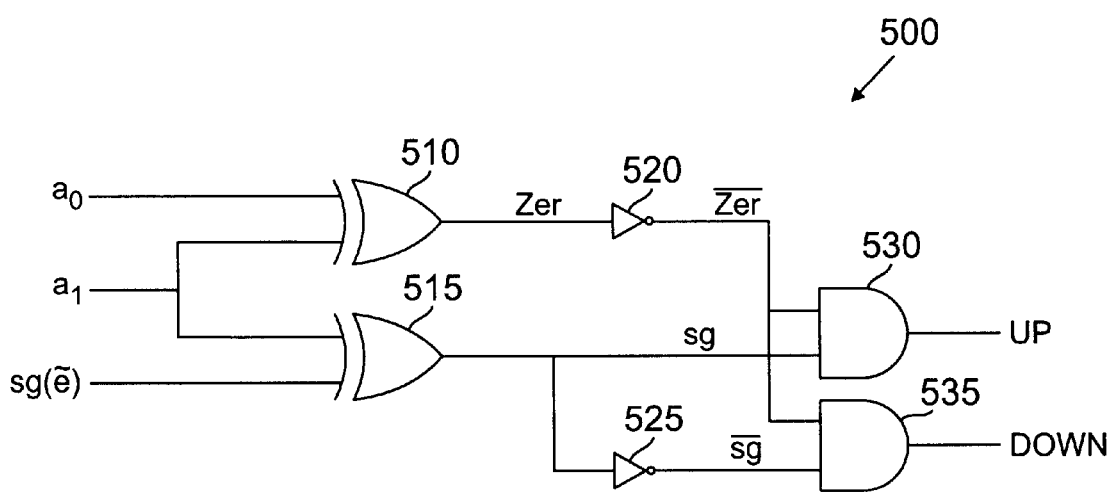
FIG. 5A provides the mapping of the digital transmit signal, $x_k$, to the two bit quantized values $a_0$ and $a_1$ used in the circuitry of FIG. 5B.

FIGS. 5A and 5B show an illustrative implementation of a correlation multiplier 500 for implementing Equation 5, where 1 bit is used to represent the sign of the error signal, $\tilde{e}(t)$, and $x_k(t)$ is represented by 2 bits (±1, 0). The mapping for the correlation multiplier 500 is shown in FIG. 5A and the corresponding logic circuitry is shown in FIG. 5B. As shown in FIG. 5B, the correlation multiplier 500 includes a pair of exclusive OR gates 510, 515, a pair of inverters 520, 525, and a pair of AND gates 530, 535. In accordance with the present invention, the input to the correlation multiplier 500 can be continuous.

Figure 6:
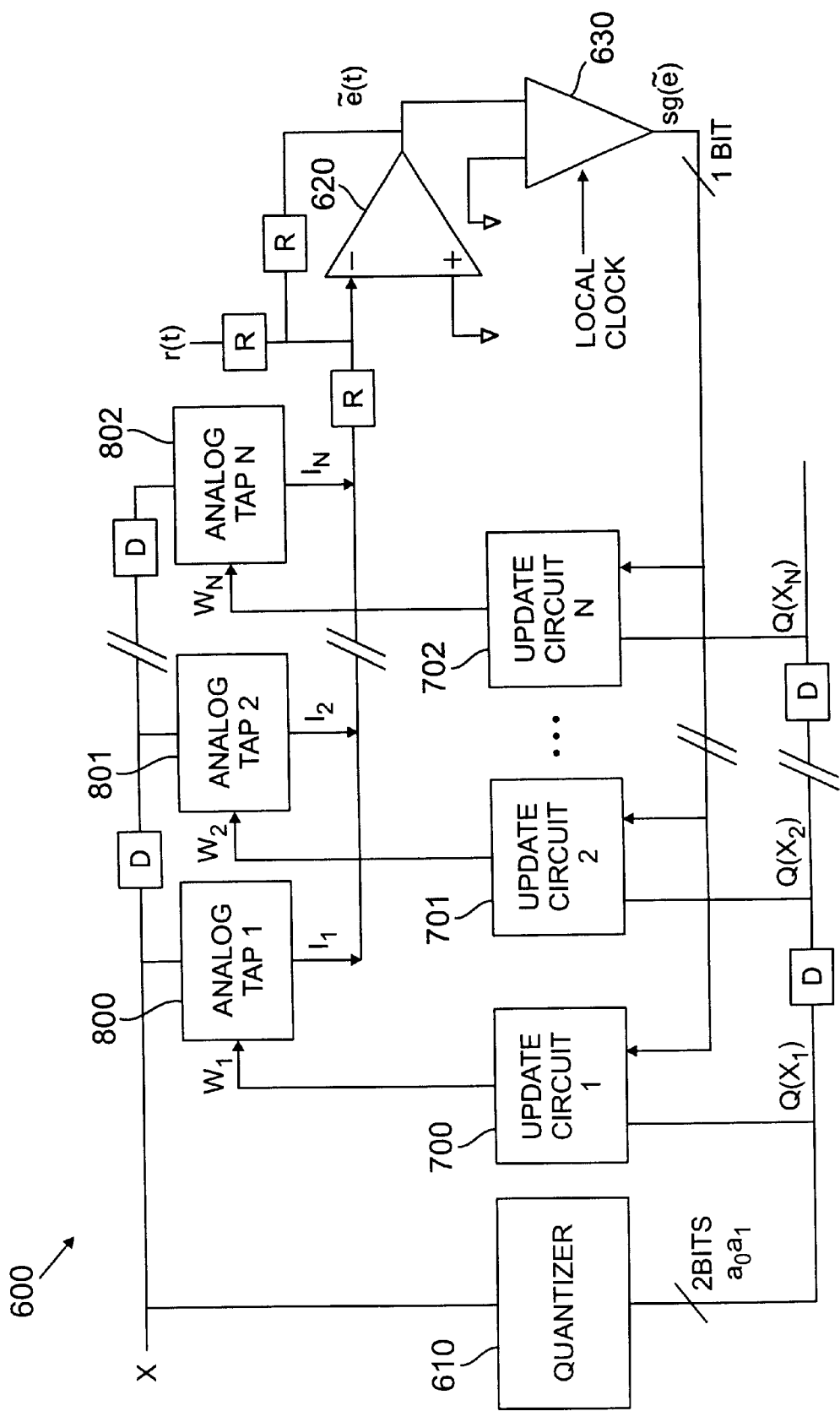
FIG. 6 illustrates a mixed-mode crosstalk canceller in accordance with the present invention.

FIG. 6 illustrates an analog implementation of the crosstalk canceller 600, discussed above in conjunction with FIG. 4. As shown in FIG. 6, the crosstalk canceller 600 includes a quantizer 610 to reduce the N-level digital symbol X to a few bits. In the illustrative example, the quantizer 610 quantizes the X value to 2 bits ($a_0 a_1$). The quantized value is then applied to an update circuit 700–702, such as the update circuit 700 discussed below in conjunction with FIG.

7. The update circuit 700 updates the corresponding tap value by dynamically determining the appropriate tap weight, $w_N$. The analog taps 800–802, such as the analog tap 800 discussed below in conjunction with FIG. 8, receive the N-level digital symbol X and weight, $w_N$, as inputs and produces an output current, $I_N$.

In addition, the crosstalk canceller 600 includes subtractor circuitry for implementing equation 6. The subtractor circuitry includes an op-amp 620 and an analog comparator 630 that produce a one-bit value representative of the sign of the error signal. The crosstalk canceller 600 also includes a number of digital delays, D, in a known manner.

Figure 7:
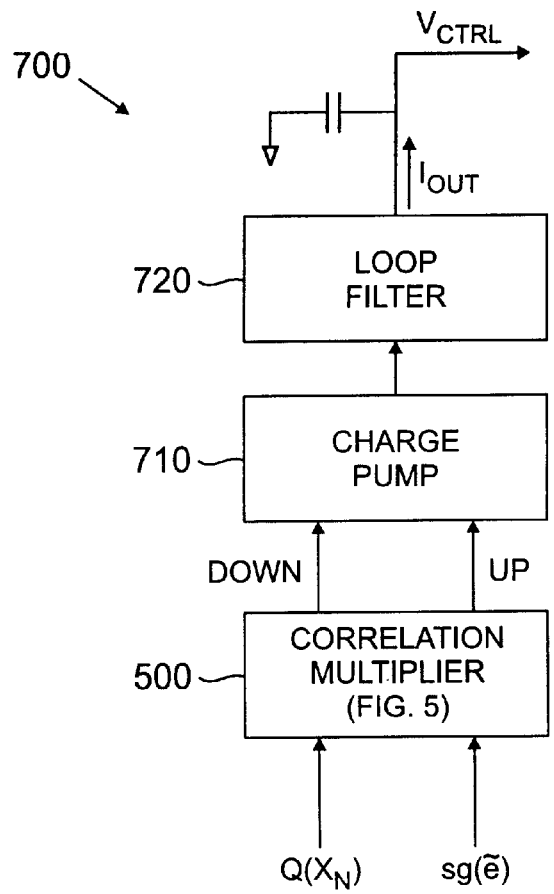
FIG. 7 is a block diagram of the update circuit of FIG. 6.

FIG. 7 illustrates an update circuit 700 of FIG. 6. As shown in FIG. 7, the update circuit 700 includes a correlation multiplier 500, discussed above in conjunction with FIG. 5B. The correlation multiplier 500 determines the optimum tap weights by generating a signal 10 indicating whether the tap weight values need to be increased or decreased to move in the direction of the gradient. The charge pump 710 may be embodied as a charge pump used for phase locked loop (PLL) circuits that generates a positive or negative current in response to the signal from the correlation multiplier 500. The step size of the least mean square (LMS) algorithm can be adjusted by sizing the current in the charge pump 710. The loop filter 720 is a proportional plus integral loop filter.

Figure 8:
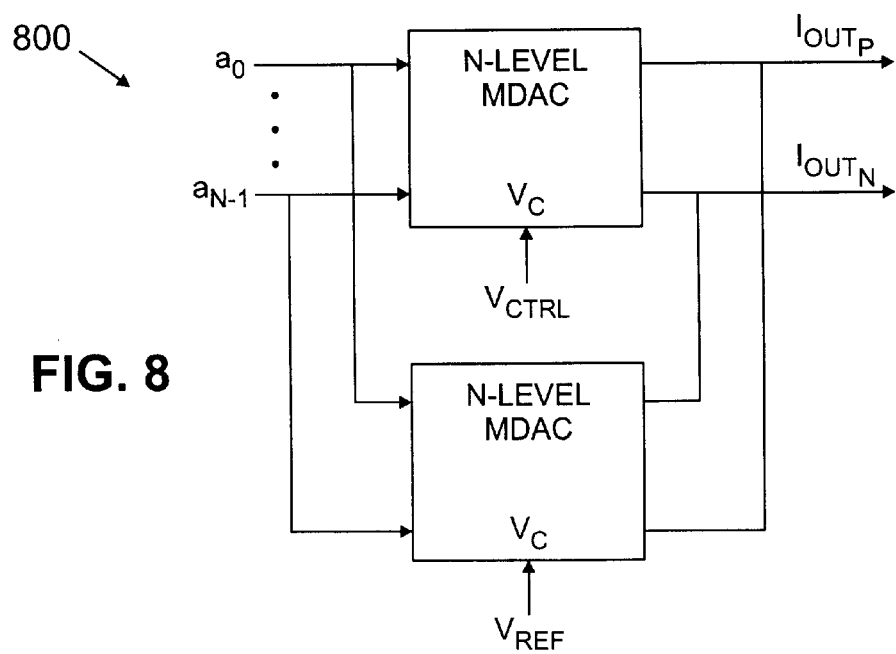
FIG. 8 is a block diagram of the analog tap of FIG. 6.

FIG. 8 illustrates the analog tap 800 of FIG. 6. $X_k$ is an N-level signal, represented by $a_0, \ldots, a_{N-1}$. It is noted that $w_k = V_{CTRL}$ less $V_{REF}$. As shown in FIG. 8, the analog tap 800 includes two cross-coupled multiplying digital to analog converters (MDAC) 900, 901 to generate signed weight values, $w_k$, by current subtraction. The output current of the analog tap 2800, Iout, equals $Iout_p$ minus $Iout_n$ and is approximately proportional to (Vctrl minus Vref) multiplied by X, where X is the digital input with thermometer representation $a_0, a_1, \ldots a_{N-1}$.

For large voltage differences (Vctrl–Vref) the relation between Iout and (Vctrl–Vref) may be a non-linear function, F. However, due to the existence of a tap update feed-back loop proper convergence of the tap weights is guaranteed, provided that the non-linear function, F, is monotonic.

Figure 9:
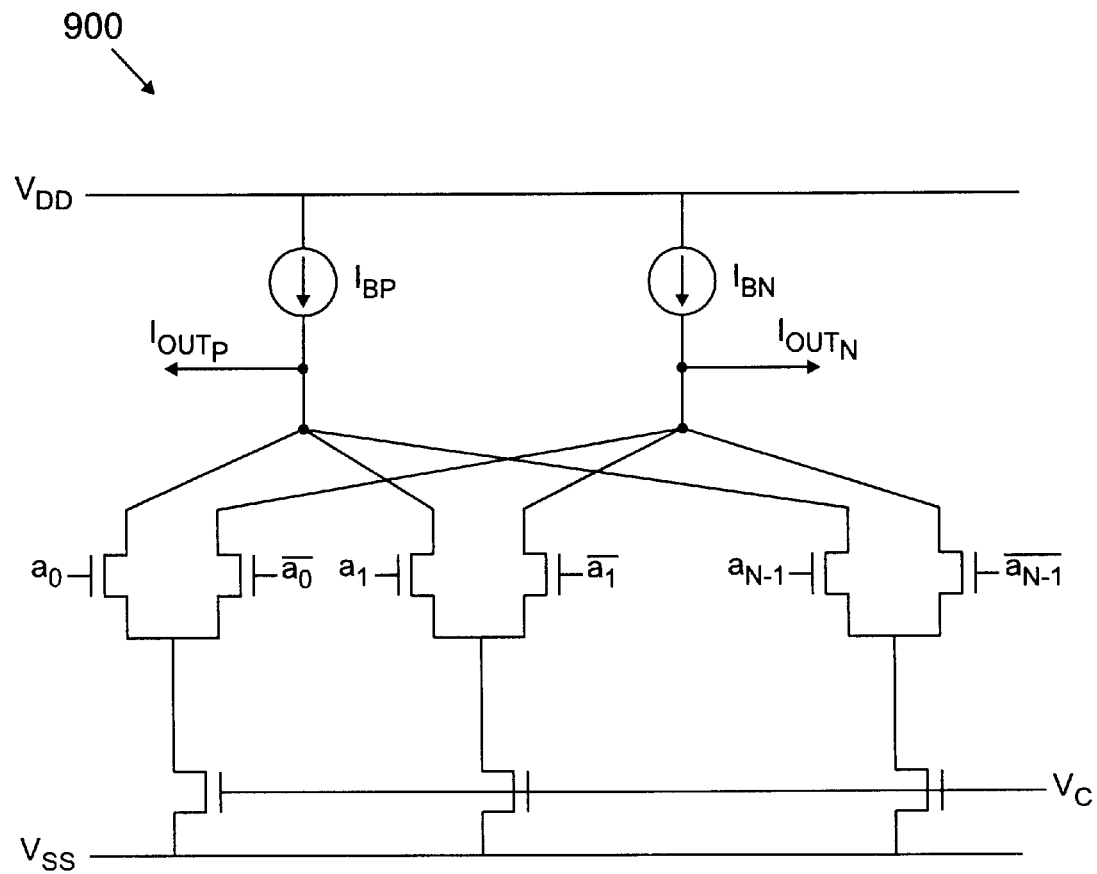
FIG. 9 illustrates the logic circuitry of the multiplying digital-to-analog converter (DAC) of FIG. 8.

The multiplying digital-to-analog converter (DAC) 900 of FIG. 8 can be implemented using the well-known current steering DAC circuitry of FIG. 9. The MDAC 900 creates an N-level voltage. The feedback of FIG. 9 eliminates the digital-to-analog conversion, with the current eventually settling to the proper value. As shown in FIG. 9, the multiplying digital-to-analog converter (NIDAC) 900 includes N parallel tail current sources 910–912 controlled by the control voltage Vc. Each tail current is "steered" either towards the positive or negative output terminal of the NIDAC depending on the value of the thermometer code digits $a_0, a_1, \ldots, a_{N-1}$. The resulting differential output current, Iout, equals $Iout_p$ minus $Iout_n$ and is proportional to X (a digital input with thermometer code representation $a_0, a_1, \ldots, a_{N-1}$). The common mode output current ($Iout_p + Iout_n$)/2 can be set to a desired value (typically 0) by adjusting the load currents ($I_{BP}$, $I_{BN}$) relative to the tail currents.

FIG. 10 illustrates the mapping between the N-level PAM symbols and their corresponding thermometer codes, $a_0, a_1, \ldots, a_{N-1}$, for the cases where N=2, 3, 4 and 5.

It is to be understood that the embodiments and variations shown and described herein are merely illustrative of the principles of this invention and that various modifications may be implemented by those skilled in the art without departing from the scope and spirit of the invention.

We claim:

1. A mixed-mode crosstalk canceller for reducing crosstalk between a transmit signal from a near-end communication device and a receive signal from a remote telecommunication device, said transmit signal being a digital signal and said receive signal being an analog signal, said crosstalk canceller comprising:

a plurality of taps for reducing energy associated with said crosstalk, each of said taps having a tap weight;

an error signal generator for producing an error signal in a continuous time domain indicating whether said tap weights are properly set; and tap weight updating means for updating said tap weights based on said digital transmit signal and said continuous time domain error signal.

2. The mixed-mode crosstalk canceller according to claim 1, further comprising a quantizer for quantizing said transmit signal.

3. The mixed-mode crosstalk canceller according to claim 1, wherein said transmit signal is a pulse amplitude modulated (PAM) signal.

4. The mixed-mode crosstalk canceller according to claim 1, wherein said error signal generator produces a signal indicating the sign of said error.

5. The mixed-mode crosstalk canceller according to claim 4, wherein said signal indicating the sign of said error indicates whether said tap weights should be increased or decreased.

6. The mixed-mode crosstalk canceller according to claim 1, wherein said tap updating means includes a correlation multiplier circuit that processes quantized versions of said digital transmit signal and said error signal to determine whether said tap weights need to be increased or decreased.

7. The mixed-mode crosstalk canceller according to claim 1, wherein said crosstalk energy is subtracted from said receive signal in the continuous time domain.

8. The mixed-mode crosstalk canceller according to claim 1, wherein said tap weights updated in a substantially continuous manner.

9. A method for reducing crosstalk between a transmit signal from a near-end communication device and a receive signal from a remote telecommunication device, said transmit signal being a digital signal and said receive signal being an analog signal, said method comprising the steps of:

reducing the energy associated with said crosstalk using a plurality of taps, each of said taps having a tap weight;

producing an error signal in a continuous time domain indicating whether said tap weights are properly set; and updating said tap weights based on said digital transmit signal and said continuous time domain error signal.

10. The method according to claim 9, further comprising a quantizer for quantizing said transmit signal.

11. The method according to claim 9, wherein said transmit signal is a pulse amplitude modulated (PAM) signal.

12. The method according to claim 9, wherein said error signal generator produces a signal indicating the sign of said error.

13. The method according to claim 12, wherein said signal indicating the sign of said error indicates whether said tap weights should be increased or decreased.

14. The method according to claim 9, wherein said tap updating means includes a correlation multiplier circuit that processes quantized versions of said digital transmit signal and said error signal to determine whether said tap weights need to be increased or decreased.

15. The method according to claim 9, wherein said crosstalk energy is subtracted from said receive signal in the continuous time domain.

16. The method according to claim 9, wherein said tap weights updated in a substantially continuous manner.

17. A mixed-mode crosstalk canceller for reducing crosstalk between a transmit signal from a near-end communication device and a receive signal from a remote telecommunication device, said transmit signal being a digital signal and said receive signal being an analog signal, said crosstalk canceller comprising:

tap means for reducing energy associated with said crosstalk, each of said tap means having a tap weight;

means for producing an error signal in a continuous time domain indicating whether said tap weights are properly set; and means for updating said tap weights based on said digital transmit signal and said continuous time domain error signal.

18. The mixed-mode crosstalk canceller according to claim 17, further comprising a quantizer for quantizing said transmit signal.

19. The mixed-mode crosstalk canceller according to claim 17, wherein said transmit signal is a pulse amplitude modulated (PAM) signal.

20. The mixed-mode crosstalk canceller according to claim 17, wherein said means for producing an error produces a signal indicating the sign of said error.

21. The mixed-mode crosstalk canceller according to claim 20, wherein said signal indicating the sign of said error indicates whether said tap weights should be increased or decreased.

22. The mixed-mode crosstalk canceller according to claim 17, wherein said tap updating means includes a correlation multiplier circuit that processes quantized versions of said digital transmit signal and said error signal to determine whether said tap weights need to be increased or decreased.

23. The mixed-mode crosstalk canceller according to claim 17, wherein said crosstalk energy is subtracted from said receive signal in the continuous time domain.

24. The mixed-mode crosstalk canceller according to claim 17, wherein said tap weights updated in a substantially continuous manner.

\* \* \* \* \*

UNITED STATES PATENT AND TRADEMARK OFFICE
CERTIFICATE OF CORRECTION

PATENT NO. : 6,584,159 B1
DATED : June 24, 2003
INVENTOR(S) : Azadet et al.

It is certified that error appears in the above-identified patent and that said Letters Patent is hereby corrected as shown below:

Title page,
Item [56], References Cited, OTHER PUBLICATIONS, insert the following:
-- Cheung et al., "A Sampled-Data Switched-Current Analog 16-Tap FIR Filter with Digitally Programmable Coefficients in 0.8um CMOS, 1997 IEEE Int'l Solid-State Circuits Conf., Session 3, Paper TP 3.3 (1997). --.

Signed and Sealed this

Sixth Day of September, 2005

JON W. DUDAS
*Director of the United States Patent and Trademark Office*